United States Patent
Vajravel et al.

(10) Patent No.: US 12,395,815 B2
(45) Date of Patent: Aug. 19, 2025

(54) PROXIMITY-BASED NETWORK REGISTRATION

(71) Applicant: Dell Products L.P., Round Rock, TX (US)

(72) Inventors: Gokul Thiruchengode Vajravel, Bangalore (IN); Vivek Viswanathan Iyer, Saint Johns, FL (US)

(73) Assignee: Dell Products L.P., Round Rock, TX (US)

( * ) Notice: Subject to any disclaimer, the term of this patent is extended or adjusted under 35 U.S.C. 154(b) by 609 days.

(21) Appl. No.: 17/855,043

(22) Filed: Jun. 30, 2022

(65) Prior Publication Data
US 2024/0007825 A1   Jan. 4, 2024

(51) Int. Cl.
*H04W 4/029* (2018.01)
*H04W 4/33* (2018.01)
*H04W 48/10* (2009.01)
*H04W 48/18* (2009.01)

(52) U.S. Cl.
CPC ............ *H04W 4/029* (2018.02); *H04W 4/33* (2018.02); *H04W 48/10* (2013.01); *H04W 48/18* (2013.01)

(58) Field of Classification Search
CPC .. G06Q 10/00–02; H04W 4/029; H04W 4/33; H04W 48/10; H04W 48/18; G06F 9/4411; G06F 9/44505; G06F 8/60; G06F 9/4451
See application file for complete search history.

(56) References Cited

U.S. PATENT DOCUMENTS

| | | | |
|---|---|---|---|
| 9,435,875 B2* | 9/2016 | Masters | G06F 9/4401 |
| 2010/0318701 A1* | 12/2010 | Srinivasan | G06Q 10/10 713/100 |
| 2014/0052974 A1* | 2/2014 | Masters | G06F 9/4406 713/1 |
| 2014/0064258 A1* | 3/2014 | Montag | H04W 84/12 370/338 |
| 2014/0204803 A1 | 7/2014 | Nguyen et al. | |
| 2014/0274151 A1* | 9/2014 | Pattabiraman | H04B 7/12 455/456.3 |
| 2016/0189726 A1* | 6/2016 | Raniwala | G06F 3/165 704/227 |
| 2017/0169533 A1* | 6/2017 | O'Brien | G06Q 50/265 |
| 2017/0255880 A1* | 9/2017 | Daher | H04N 7/183 |
| 2018/0033227 A1* | 2/2018 | Gokcebay | G07C 9/00896 |
| 2019/0306007 A1 | 10/2019 | Natarajan et al. | |
| 2020/0218927 A1* | 7/2020 | Arunachalam | G06V 10/96 |

(Continued)

*Primary Examiner* — Mehmood B. Khan
(74) *Attorney, Agent, or Firm* — Larson Newman, LLP

(57) ABSTRACT

Shared hoteling workspaces and computer equipment are preconfigured based on location. A location associated with a mobile device is monitored. As the mobile device moves toward a workspace, computer equipment associated with the workspace are automatically preconfigured for use. Different configuration events and operational states may be implemented, based on a locational proximity of the mobile device to the workspace. When the mobile device arrives at the workspace, the mobile device has been automatically paired/registered with the computer equipment at the workspace. Moreover, when the location of the mobile device no longer matches the workspace, the network pairings/registrations may be automatically torn down and deleted, thus making the workspace available for a next occupant.

20 Claims, 9 Drawing Sheets

(56) References Cited

U.S. PATENT DOCUMENTS

| | | |
|---|---|---|
| 2020/0296088 A1 | 9/2020 | Brown et al. |
| 2021/0288878 A1 | 9/2021 | Smith et al. |
| 2021/0289029 A1 | 9/2021 | Smith et al. |
| 2021/0374620 A1* | 12/2021 | Tokuchi ................ G06Q 10/109 |
| 2022/0036258 A1* | 2/2022 | Leach .................... G06Q 30/08 |
| 2023/0050116 A1* | 2/2023 | Franc De Ferriere . G06Q 10/02 |

* cited by examiner

PROXIMITY-BASED NETWORK REGISTRATION

FIELD OF THE DISCLOSURE

This disclosure generally relates to information handling systems, and more particularly relates to personalized configuration and network registration of shared computer peripherals based on a user's location.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

Shared workspaces and computer equipment are preconfigured based on location. In today's work from home environment, employees infrequently visit office buildings. Cubicles, desks, and their accompanying computer equipment are thus shared by different employees in a hoteling arrangement. Should an employee reserve a workspace, a location of the employee's personal device (such as a smartphone or laptop computer) is monitored. As the employee enters the building and walks to the reserved workspace, the computer equipment is automatically preconfigured for use with the employee's personal device. Different configuration events and operational states may be implemented, based on a locational proximity of the employee's personal device to the workspace. When the employee arrives at the cubicle, desk, or other workspace, the employee's smartphone and laptop computer are paired/registered with WI-FI®, BLUETOOTH®, and other wireless networks serving the workspace. The employee may thus immediately and productively use the computer equipment, without manual configurations that consume precious reserved time. Moreover, when the location of the personal device no longer matches the workspace, the employee may be assumed to have vacated the workspace. The network pairings/registrations may thus be automatically torn down and deleted, thus making the workspace available for another employee.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
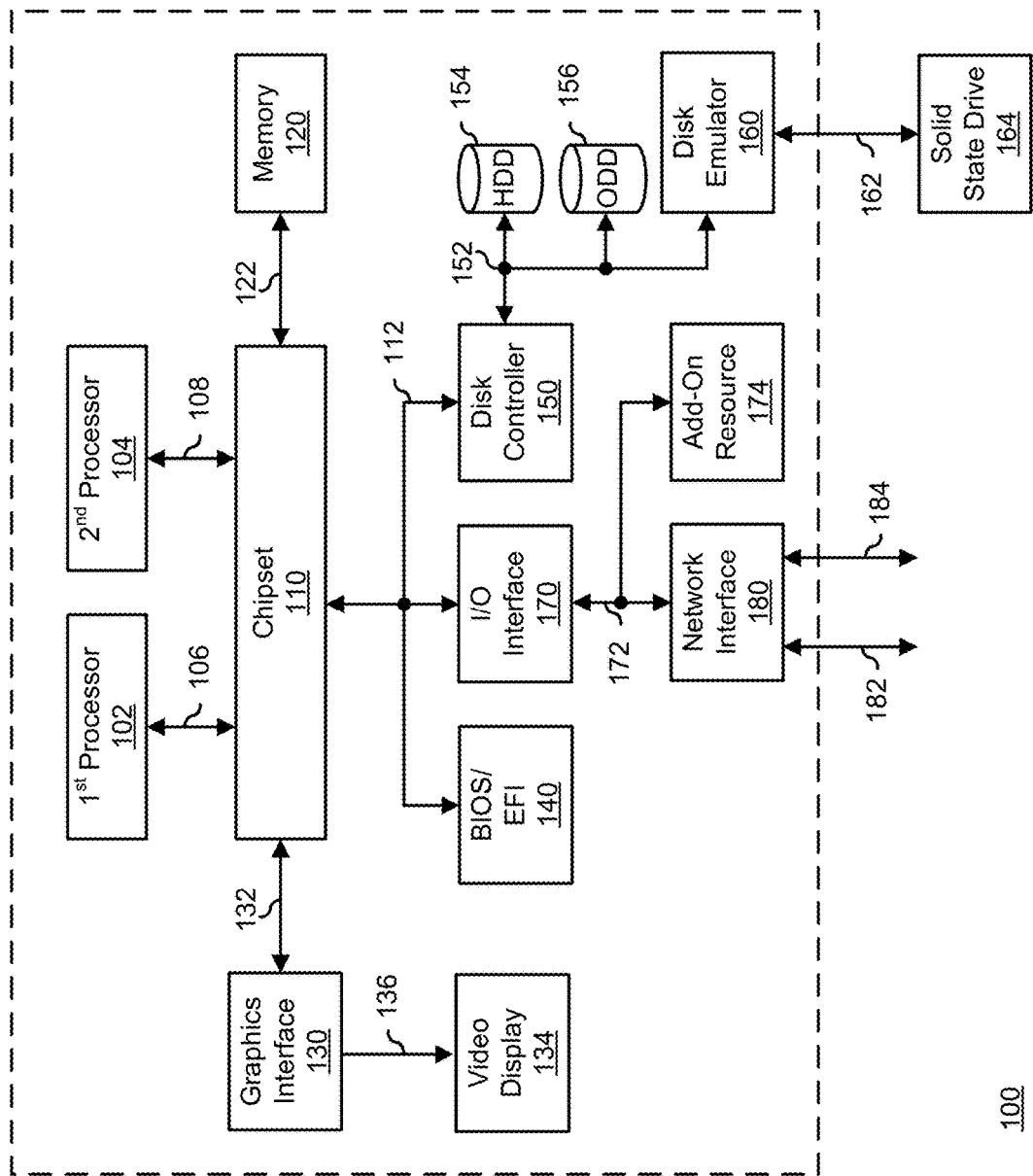
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, and a network interface device 180. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel is of a different type than peripheral channel 172 and network interface device 180 translates information from a format suitable to the peripheral channel to a format suitable to external devices. In a particular embodiment, network interface device 180 includes a host bus adapter (HBA), a host channel adapter, a network interface card (NIC), or other hardware circuit that can connect the information handling system to a network. An example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

The information handling system 100 may include a baseboard management controller (BMC). The BMC is connected to multiple elements of information handling system 100 via one or more management interface to provide out of band monitoring, maintenance, and control of the elements of the information handling system. As such, BMC represents a processing device different from processors 102 and 104, which provides various management functions for information handling system 100. In an embodiment, BMC may be responsible for granting access to a remote management system that may establish control of the elements to implement power management, cooling management, storage management, and the like. The BMC may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC includes a network interface that can be connected to a remote management system to receive firmware updates, as needed or desired. Here BMC receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC utilizes various protocols and application programming interfaces (APIs) to direct and control the processes for monitoring and maintaining the system firmware. An example of a protocol or API for monitoring and maintaining the system firmware includes a graphical user interface (GUI) associated with BMC, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC is included on a main circuit board (such as a baseboard, a motherboard, or any combination thereof) of information handling system 100, or is integrated into another element of the information handling system such as chipset 110, or another suitable element, as needed or desired. As such, BMC can be part of an integrated circuit or a chip set within information handling system 100. BMC may operate on a separate power plane from other resources in information handling system 100. Thus BMC can communicate with the remote management system via network interface or the BMC can communicate with the external mobile device using its own transceiver circuitry while the resources or elements of information handling system 100 are powered off or at least in low power mode. Here, information can be sent from the remote management system or external mobile device to BMC and the information can be stored in a RAM or NV-RAM associated with the BMC. Information stored in the RAM may be lost after power-down of the power plane for BMC, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

Network registration is cumbersome. Information handling systems may interface with a wide variety of computer peripheral devices such as printers, monitors, wireless keyboards, digital pens, and audio/video headsets. Information handling systems, and computer peripheral devices, often require registration and configuration, especially in today's hybrid work hoteling environment. When office desks/cubicles are shared and hot-swapped between transient employees, manual network registration is cumbersome and time-consuming.

Figure 2:
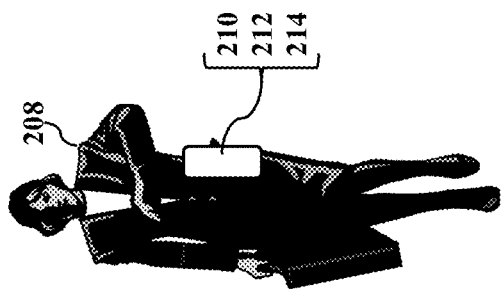
FIGS. 2-3 illustrate a workspace-sharing environment, according to exemplary embodiments.
Figure 2:
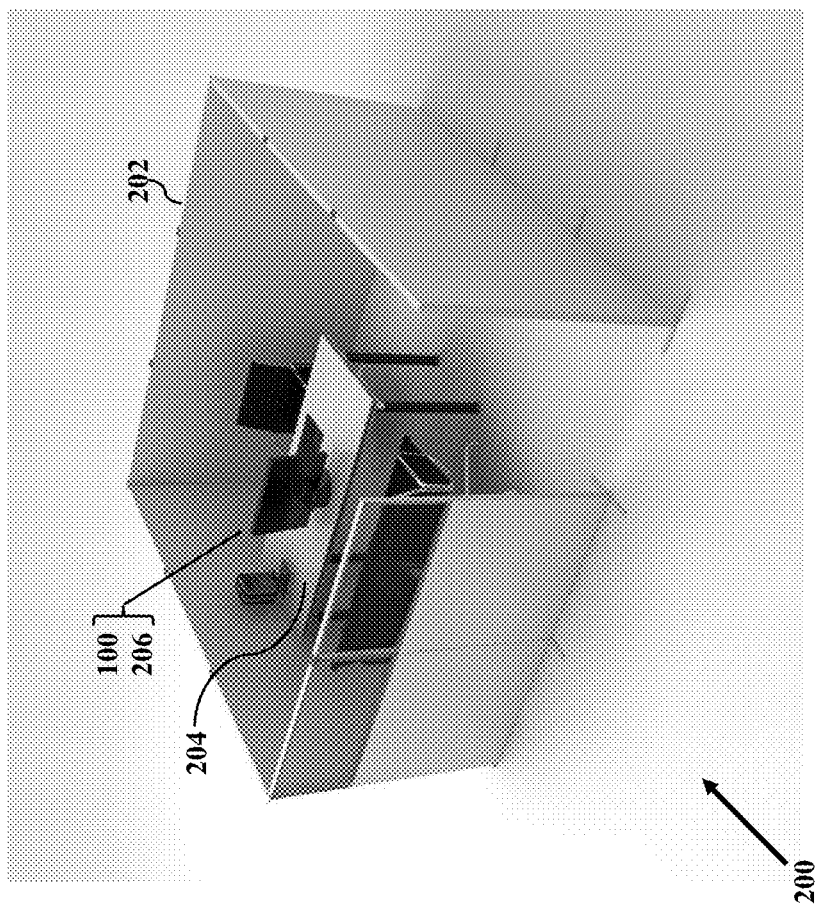
Figure 3:
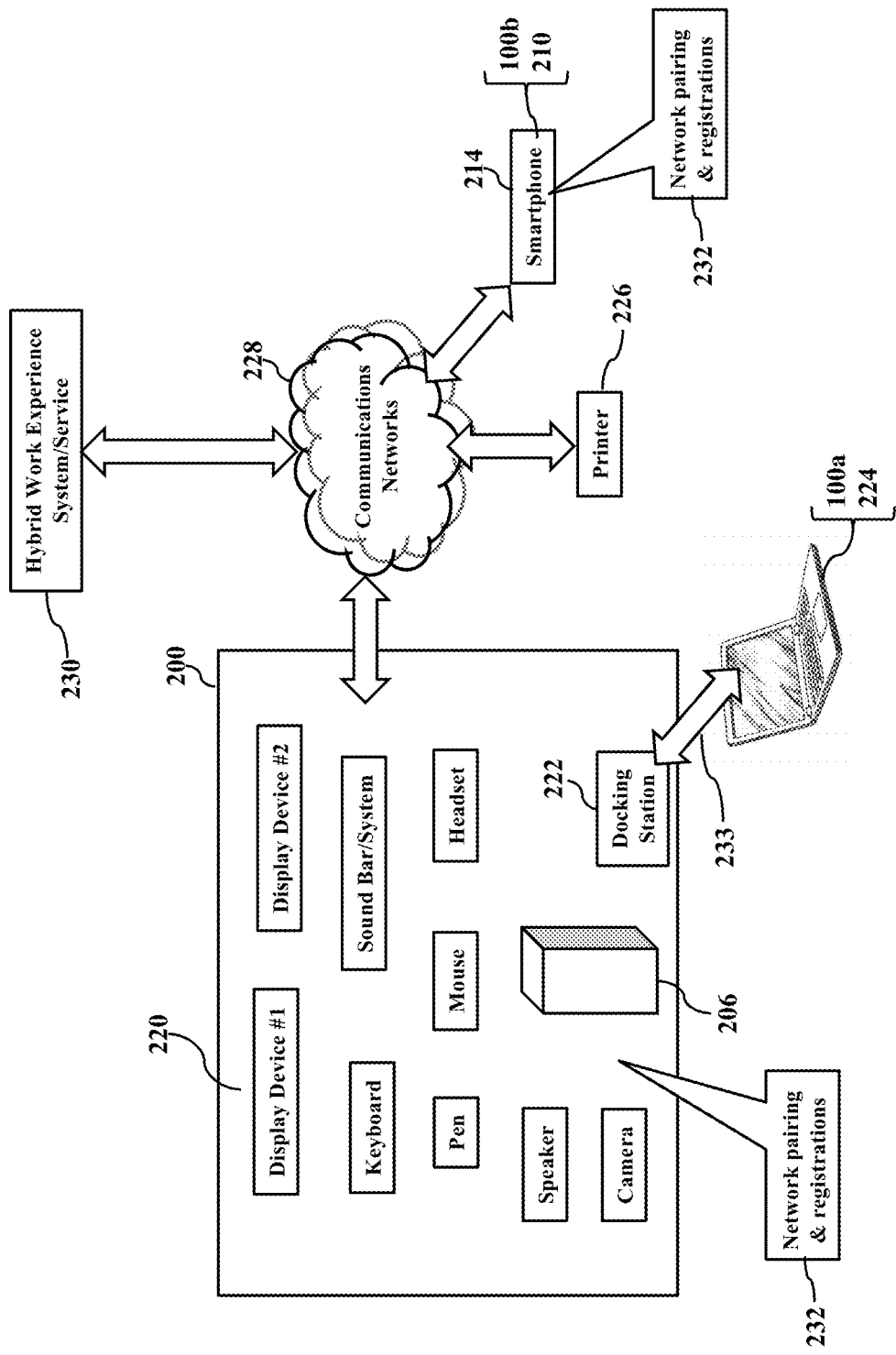

FIGS. 2-3 illustrate a workspace-sharing environment, according to exemplary embodiments. FIG. 2 illustrates a shared workspace 200 found in many office buildings, hotels, libraries, and other shared environments. The workspace 200 is available for use by transient employees, hotel guests, patrons, and other users. FIG. 2 illustrates the workspace 200 as a generic cubicle 202 having a desk 204 and the information handling system 100 (illustrated as a desktop computer 206). Because the workspace 200 is shared by many different users, an occupant 208 has reserved the workspace 200 for a period of time. As the occupant 208 walks through a building and to the workspace 200, exemplary embodiments infer her physical location 210, based on electromagnetic signals (such as GPS, radio, WI-FI, Bluetooth, NFC signals) transmitted by her personal device(s) 212. FIG. 2 illustrates the occupant's personal device 212 as a smart cellular telephone 214. The occupant's personal device 212, however, may be a smartwatch, mobile laptop computer, a tablet computer, electronic employee/visitor badge, or any other electronic device.

As the occupant 208 carries the smartphone 214, the smartphone 214 establishes communications with various communications networks (such as cellular/GPS, radio, WI-FI®, BLUETOOTH®, and NFC signals) available within an office, hotel, or other building. As the occupant 208 walks, exemplary embodiments infer her indoor/outdoor location 210, based on GPS and/or network presences registered to her smartphone 214. Exemplary embodiments may thus pre-configure the desktop computer 206 to her preferred settings. Exemplary embodiments may also wirelessly register her smartphone 214 with available networks. So, when the occupant 208 arrives at the workspace 200, her smartphone 214 is wirelessly paired with the computer 206 and ready to use, according to her desired configurations.

FIG. 3 further illustrates electronic equipment 220 available within the workspace 200. As the reader likely understands, the desktop computer 206 may interface with many wired/wireless peripheral devices 220. Some of these peripheral devices 220 may include a keyboard, one or more video displays, a tactile mouse, a digital pen, external speaker(s), a video/web camera, a sound bar system, and/or a headphone. The workspace 200 may additionally or alternatively provide a docking station 222 that interfaces with any of the user/occupant's personal devices 212 (such as a mobile information handling system 100a, illustrated as a laptop computer 224). Any or all of the electronic peripheral equipment 220 may interface with a shared network printer 226 via a communications network 228. Moreover, any or all of the cubicle's electronic peripheral equipment 220 may interface via the communications network 228 with the user's mobile smartphone 214.

The shared workspace 200 poses many configuration problems. For example, when the occupant 208 arrives at the shared workspace 200, the desktop computer 206 and other electronic peripheral equipment 220 may be in a low-power mode to conserve electrical power (for example due to non-use). Often, then, the hoteling occupant 208 (illustrated in FIG. 2) wastes precious minutes "waking up" the electronic peripheral equipment 220. Moreover, the occupant 208 wastes much time pairing/registering the electronic peripheral equipment 220. The occupant 208, for example, must manually pair or register their smartphone 214 and/or laptop 224 to the workspace's WI-FI® network. The occupant 208 may further manually BLUETOOTH® pair her smartphone 214 and/or laptop 224 to the workspace's shared electronic peripheral equipment 220. These network pairing and registrations are cumbersome and consume precious time, especially when the workspace 200 is tightly scheduled for back-to-back start/end reservations. When the current occupant's workspace 200 reservation ends, these pairing registrations must often be manually deleted or ended. As a further problem, when the workspace 200 reservation ends, the shared electronic peripheral equipment 220 stores/retains much data that may be personal and/or proprietary. The user/occupant 208 must remember to manually delete/clear this data from the shared electronic peripheral equipment 220 to prevent disclosure.

Exemplary embodiments, instead, manage virtual pairings with the cubicle's shared electronic peripheral equipment 220. Any or all of the electronic peripheral equipment 220 may interface with a hybrid work experience system or service 230. The hybrid work experience system/service 230 is a computer server or cloud-based service that manages and configures the cubicle's shared electronic peripheral equipment 220, based on the smartphone's location 210. That is, as the occupant 208 walks through the building, on her way to the workspace 200, at some point (such as a predefined location and/or time) the hybrid work experience system/service 230 begins configuring the cubicle's electronic peripheral equipment 220 to coincide with her arrival. When the occupant 208 arrives at the workspace 200, for example, the shared electronic peripheral equipment 220 has been awoken from their low-power states.

Virtual network pairing registrations 232 have been automatically and timely performed with her personal devices 212 (such as the smartphone 214 and the laptop 224). Reserved software resources have been authorized, installed, and/or initialized. So, as soon as the occupant 208 enters the cubicle 202, the workspace's shared electronic peripheral equipment 220 are ready for personalized use. The occupant 208 may immediately connect the laptop computer 224 to the docking station 22 (perhaps via a USB cable or a wireless pairing), thus establishing a time delimited, two-way communications TCP/IP session 233 between endpoints. The session 233, for example, may be enabled from the reservation's start date/time and torn down or ended at the reservation's stop date/end time. The occupant wastes no time manually pairing and registering with the communications networks 208. The occupant may thus immediately use the workspace 200 to create and share content, conduct video conference calls, play games/media, and other productive tasks.

Exemplary embodiments provide a seamless, workspace ecosystem experience. In today's work environment, more and more people are working from home and only hoteling or sharing office workspaces 200. Productivity is a premium during limited, reserved times of shared equipment. Because the workspace 200 is shared, the configurations of the electronic peripheral equipment 220 must be dynamically established, and perhaps torn down, in timely succession according to a reservation schedule and to the occupant's location 210. Because the workspace's shared electronic peripheral equipment 220 may be just-in-time preconfigured for the occupant's arrival date/time reservation, the occupant 208 has an immediate best experience with the shared electronic peripheral equipment 220 and, by inference, the employer, hotel, library, landlord, owner, or building's service provider. Exemplary embodiments deliver continuity of service across multiple end user devices. Exemplary embodiments manage seamless fusion and selection of audio/video input and outputs, content sharing, and conferencing. Exemplary embodiments solve basic interoperability pain points across clients, docks, and ecosystem devices. The shared electronic peripheral equipment 220 are connected to the occupant's personal devices 212 using wired and wireless protocols.

Figure 4:
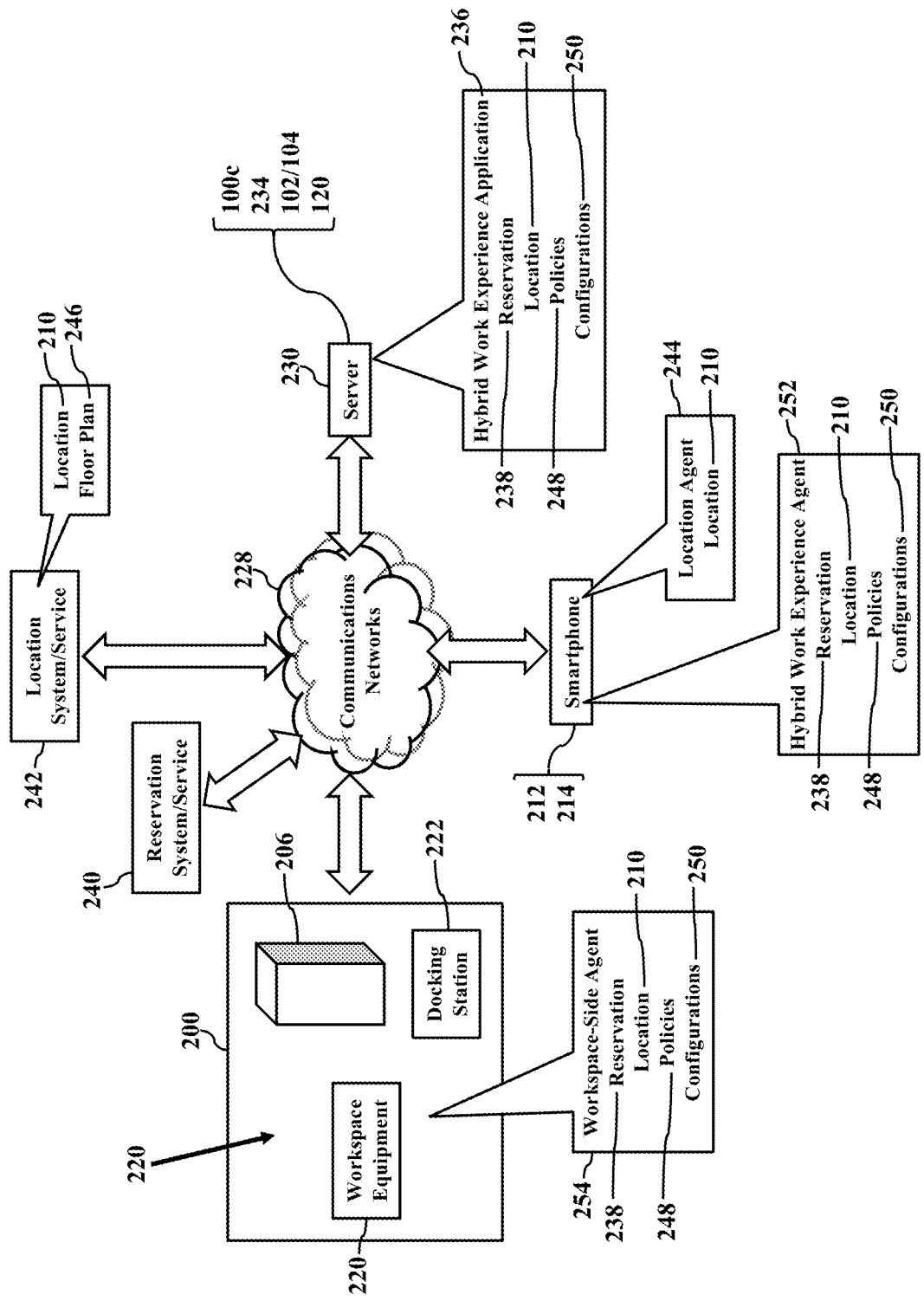
FIG. 4 illustrates proximity-based configuration, according to exemplary embodiments.

FIG. 4 illustrates more details for proximity-based configuration, according to exemplary embodiments. The hybrid work experience system/service 230 is another information handling system 100c and illustrated as a server 234. The server 234 stores, executes, and/or hosts a hybrid work experience software application 236. The hybrid work experience software application 236 is stored in the memory 120, and the hardware processors 102/104 execute the programming statements or languages representing the hybrid work experience software application 236. The hybrid work experience software application 236 causes the server 234 to specially perform operations, such as receiving a workspace reservation 238 associated with the occupant's smartphone 214. The occupant 208 (illustrated in FIG. 1), in other words, has scheduled the workspace 200 from a start date/time to an end date/time. The occupant 208 may have further requested the workspace 200 for its hardware and software resources.

While the workspace reservation 238 may be determined and managed by the hybrid work experience software application 236, FIG. 4 illustrates a system solution in which the workspace reservation 238 is generated by, and sent from, a reservation system 240. The reservation system 240 may be a cloud-based service, third party, or computer server (not shown for simplicity) that schedules different, shared workspaces 200 among individuals, teams, or other entities. The reservation system 240 matches available workspaces 200 to requests, perhaps according to date/time and to the requested hardware and software resources. Gaming engineers or users, for example, may require the highest performance workspaces. Video editors and digital artists may need the highest-resolution display capabilities. The reservation system 240 determines the appropriate workspace 200 and provides the workspace reservation 238 via the communications network 228 to the hybrid work experience system/service 230, to the occupant's personal device 212, and/or to the electronic peripheral equipment 220.

The hybrid work experience system/service 230 may also receive the location 210. While the location 210 may be determined and managed by the hybrid work experience system/service 230, FIG. 4 illustrates a system solution in which the location 210 is generated by, and sent from, a location system 242. The location system 242 is a cloud-based service, third party, or computer server (not shown for simplicity) that interfaces with the occupant's personal devices 212 (such as the smartphone 214) and with the hybrid work experience system/service 230. The smartphone 214 stores and executes a device-side location software agent 244. The device-side location software agent 244 is a software application that cooperates with the location system 242, perhaps in a client/server relationship, to determine the location 210 associated with the smartphone 214 and, by inference, the individual occupant 208.

The location system 242, for example, may obtain a GPS location reported by the smartphone 214 (such as when GPS signals are received within a building). The location system 242 may additionally or alternatively infer the location 210 (such as an indoor position) based on reception of electromagnetic signals sent by or received from the occupant's smartphone 214. As the occupant 208 carries the smartphone 214, the smartphone 214 sends signals to, and/or registers with, various access points to the communications networks 228 (perhaps cellular/GPS, radio, WI-FI®, BLUETOOTH®, NFC signals) available within an office, hotel, or other building.

Because the occupant 208 is associated with her smartphone 214, the smartphone's indoor location 210 is inferred by the location system 242 (perhaps based on signal strength and/or access point (AP) information) and sent via the communications network 228 to the hybrid work experience system/service 230 and/or to the location software agent 244. The location system 242 and/or to the location software agent 244 may even consult a digital floor plan 246 that maps different workspace locations (such as the location of the cubicle 202) to the various communications networks 228 available within the building. As the occupant walks within the building, the location system 242 may nearly precisely estimate and update the location 210 with respect to the digital floor plan 246 (for example, nearing an elevator or arriving at a particular floor level, hallway, entry, room, or the cubicle 202).

Governing policies 248 may be implemented. Once the smartphone's location 210 is determined (perhaps with reference to the floor plan 246), the location 210 may be compared to the policies 248 (perhaps accessed by querying a policy database for the location 210 and retrieving/identifying the corresponding location-based policy). The policies 248 define events and/or states to order or implement, based on the smartphone's location 210. The policies 248, for example, may be expressed as logical statements defining where and when certain network pairings/registrations/configurations 250 are commenced. As the smartphone 214 travels within the building, the hybrid work experience system/service 230 may push or command particular WI-FI®, BLUETOOTH®, and other network pairings and registrations to network access points, to the smartphone 214, and/or to the cubicle's shared electronic peripheral equipment 220.

Exemplary embodiments may thus manage virtual pairings with the workspace's shared electronic peripheral equipment 220. The hybrid work experience system/service 230 may also interface with a device-side hybrid work experience software agent 252 stored and executed by the occupant's personal device 212 (such as the smartphone 214 and/or the laptop 224 illustrated in FIG. 2). The hybrid work experience system/service 230 may also interface with a workspace-side software agent 254 stored and executed by any or all of the workspace's electronic peripheral equipment 220. The hybrid work experience system/service 230 cooperates with the software agents 244, 252, and 254, perhaps in a client/server relationship, to dynamically configure/pair/register the smartphone 214, the laptop 224, and any other personal devices 212 for use with the cubicle's shared electronic peripheral equipment 220. As the smartphone 214 and/or the laptop 224 moves through the building and toward the workspace 200, exemplary embodiments begin configuring the various WI-FI®, BLUETOOTH®, and other communications networks 228 for immediate, productive use. So, as soon as the occupant 208 arrives at the cubicle 202, the cubicle's shared electronic peripheral equipment 220 are ready for personalized use. The occupant wastes no time manually pairing and registering with the communications networks 228. The occupant may thus immediately use the workspace 200 to create and share content, conduct video conference calls, play games/media, and other productive tasks.

Figure 5:
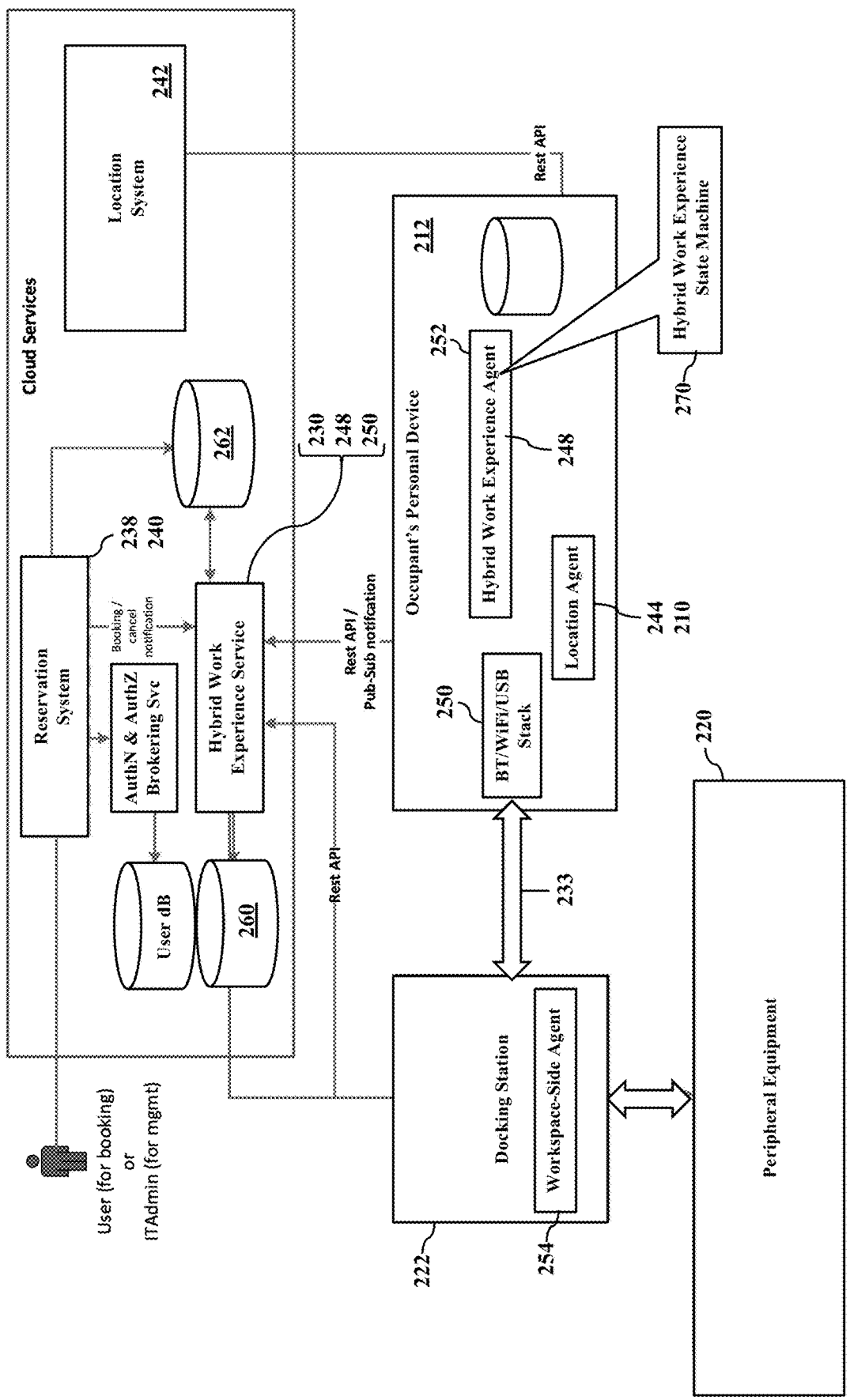
FIG. 5 is a block diagram illustrating a service architecture, according to exemplary embodiments.

FIG. 5 is a block diagram illustrating a service architecture, according to exemplary embodiments. The location system 242 is illustrated as a cloud service that interfaces with the occupant's personal device 212. The occupant's personal device 212 stores and executes the device-side location software agent 244 that cooperates with the location system 242 to determine the location 210. The location 210 is thus sent to or shared with the hybrid work experience system/service 230. The reservation system 240 is illustrated as a cloud service that interfaces with the hybrid work experience system/service 230. The reservation system 240 generates and manages the workplace reservation 238 and sends the workplace reservation 238 to the hybrid work experience system/service 230. When the hybrid work experience system/service 230 receives the workplace reservation 238 and the location 210, the hybrid work experience system/service 230 may consult electronic databases to establish network pairings and other configurations. An electronic database 260 of peripherals, for example, stores and maintains database entries describing an inventory of peripheral devices (such as the electronic peripheral equipment 220 available at different, reservable workplaces 200).

The electronic database 260 of peripherals identifies equipment models, serial numbers, IP addresses, networking and other configuration parameters, and other information/data associated with any piece of the electronic peripheral equipment 220. An electronic database 262 of workspaces stores and maintains database entries describing a list, roster, or inventory of workspaces 200 that are available for transient/hoteling uses. The electronic database 262 of workspaces identifies networks 228 that are available at each workspace 200, along with networking information, IP addresses, and other configuration parameters. The hybrid work experience system/service 230 may thus query the databases 260 and 262 to identify the electronic peripheral equipment 220 associated with the workspace 200, their corresponding network address, IEEE 802 MAC identifier, other configuration data, and LAN/WAN/WWAN networking data.

As FIG. 5 illustrates, the hybrid work experience system/service 230 network pairs/registers based on the location 210. The occupant's personal device 212 stores and executes the device-side hybrid work experience software agent 252. The occupant's personal device 212 also stores and executes the device-side location software agent 244. The hybrid work experience system/service 230, the device-side hybrid work experience software agent 252, and/or the device-side location software agent 244 may thus cooperate to determine the location 210 associated with the occupant's personal device 212. The hybrid work experience system/service 230 may thus interface with the device-side hybrid work experience software agent 252 and the device-side location software agent 244 to periodically or nearly continuously monitor the location 210 and to execute the corresponding networking configuration policies 248. The hybrid work experience system/service 230 and the device-side hybrid work experience software agent 252 thus cooperate and compare the location 210 to the policies 248.

When the location 210 matches a location-based policy 248, the device-side hybrid work experience software agent 252 causes the scheduled occupant's personal device 212 to identify, retrieve, and push/send the corresponding WI-FI®, BLUETOOTH®, USB, NFC, or other IEEE 802 networking configurations 250 to the electronic peripheral equipment 220 associated with the workplace 200. FIG. 5, for example, illustrates the occupant's personal device 212 sharing the networking configurations 250 with the docking station 222 operating in, or assigned to, the workspace 200. The occupant's personal device 212 may send the networking configurations 250 via the communications network 228 to the IP address associated with the docking station 222.

When the docking station 222 receives the networking configurations 250, the docking station 222 may then share/distribute/send the networking configurations 250 to the other electronic peripheral equipment 220 associated with the workspace 200. The workspace-side hybrid work experience software agent 254, for example, stored and executed by docking station 222, instructs or causes the docking station 222 to send the networking configurations 250 to the other electronic peripheral equipment 220 assigned to the workspace 200. By the time the occupant's personal device 212 arrives at the workspace 200, exemplary embodiments have automatically registered and paired the transient user's smartphone 214 and laptop 224 with network access points serving the workspace 200 and with the electronic peripheral equipment 220 assigned to the workspace 200.

Exemplary embodiments thus provide an elegant networking solution for hoteling users. The location system 242 and the location agent 244 cooperate to identify the current location 210 associated with the occupant's personal device 214, perhaps correlated to the floor plan 246. The current location 210 may be determined in any geographical coordinates, units, or GIS format (such as the GeoJSON format). Once the current location 210 is determined, the hybrid work experience agent 252 maintains and manages a hybrid work state machine 270. The hybrid work experience agent 252 and the hybrid work experience system/service 230 cooperate to identify, retrieve, and/or pull the networking configurations 250 and other best known configurations ("BKC") and secrets associated with the workspace equipment 220 operating at/in the booked/reserved workspace 200.

The hybrid work experience agent 252 may then provide software handlers to implement virtual-pairing and un-pairing. The workspace-side agent 254 (such as executed by the docking station 222) may maintain the active session 233 with the hybrid work experience system/service 230 for receiving networking and other events associated with the policies 248. The hybrid work experience system/service 230 stores the networking configurations 250 and other best known configurations ("BKC") and secrets associated with the workspace equipment 220. The hybrid work experience system/service 230 also stores WI-FI®, BLUETOOTH®, and other networking profiles associated with wireless access points serving, or in proximity to, the workspace 200 and/or the workspace equipment 220.

Exemplary embodiments overcome many problems. In the hybrid work hoteling environment, for example, when the cubicle 202 is not in use, the docking station 222 and its connected peripherals 220 will be put into the low power state to conserve electrical power. This creates last mile problems like the end user manually waking up the cube's the docking station 222 and its connected peripherals 220 for preparation and pairing. The hoteling user must also manually un-pair/clean when leaving the cube 202. Exemplary embodiments, instead, prepare and pre-configure the cubicle 202 for a next/scheduled session 233, based on the location 210. The hybrid work experience system/service 230 sends commands or instructions to the IP address(es) associated with the equipment 220, and the hybrid work experience system/service 230 and the workspace-side agent 254 cooperate to command and cause the equipment 220 to transition from low power (sleep) state to active state, perhaps only when the reserved user approaches to the cube (say <=X meters).

When the scheduled session 233 completes or ends (such as indicated by the occupant's personal device 212 and/or the docking station 222), the hybrid work experience agent 252 and/or the workspace-side agent 254 inform the hybrid work experience system/service 230. The hybrid work experience system/service 230 and the workspace-side agent 254 cooperate to prepare the workspace 200 (such as the docking station 222 and the other peripheral equipment 220 assigned to the cubicle 202) for next user session. Moreover, exemplary embodiments may also prepare the occupant's personal device 212 for the session 233, based on the location 210. The hybrid work experience agent 252 and the hybrid work experience system/service 230 cooperate to move the occupant's personal device 212 (such as the laptop computer 224) from low power (sleep) state to active state, perhaps upon approach to the cubicle's floor (say <=X floors from the reserved workspace 200).

Once the location 210 indicates the laptop computer 224 is within a predefined radios/distance (say 1 floor away from the reserved cubicle 202), the hybrid work experience agent 252, the workspace-side agent 254, and the hybrid work experience system/service 230 cooperate to enable the networking configurations 250 (such as a BLUETOOTH® stack) and to implement an IT Admin recommended configuration. Once the location 210 is near to the cubicle 202 (say <=X meters), the hybrid work experience agent 252, the workspace-side agent 254, and the hybrid work experience system/service 230 cooperate to initiate the virtual pairing with the cube's peripherals 220 and connect to them.

Exemplary embodiments may initiate data cleanup. That is, the hybrid work experience agent 252, the workspace-side agent 254, and the hybrid work experience system/service 230 may cooperate to virtually un-pair and disconnect the occupant's personal device 212 from the peripheral equipment 220, perhaps based on the location 210. When the laptop computer 224 moves or strays from the cubicle 202 (say >X meters) for more than a predefined time, exemplary embodiments may infer the occupant's session has ended. The hybrid work experience agent 252, the workspace-side agent 254, and the hybrid work experience system/service 230 may cooperate to implement virtual un-pairing with cube's peripherals 220 and, after a predetermined time, delete any stored data (such as secrets and other proprietary/personal information) from the desktop computer 206, the docking station 22, and the other peripherals 220.

Exemplary embodiments thus provide a seamless, zero-touch proximity-based hybrid work solution. Exemplary embodiments monitor the dynamic location 210 and compare to the static location associated with the workspace 200. Exemplary embodiments receive user/occupant intentions (such as start and stop the session 233) and take actions.

Exemplary embodiments thus provide an auxiliary service that automatically manages reservations, the peripheral endpoints, and network pairing processes/connections based on device proximity mapping (for example, the indoor location 210). Moreover, because hybrid work environments likely have many different and assignable workspaces 200, exemplary embodiments may scale for multiple reserved users and hybrid work cubes.

Figure 6:
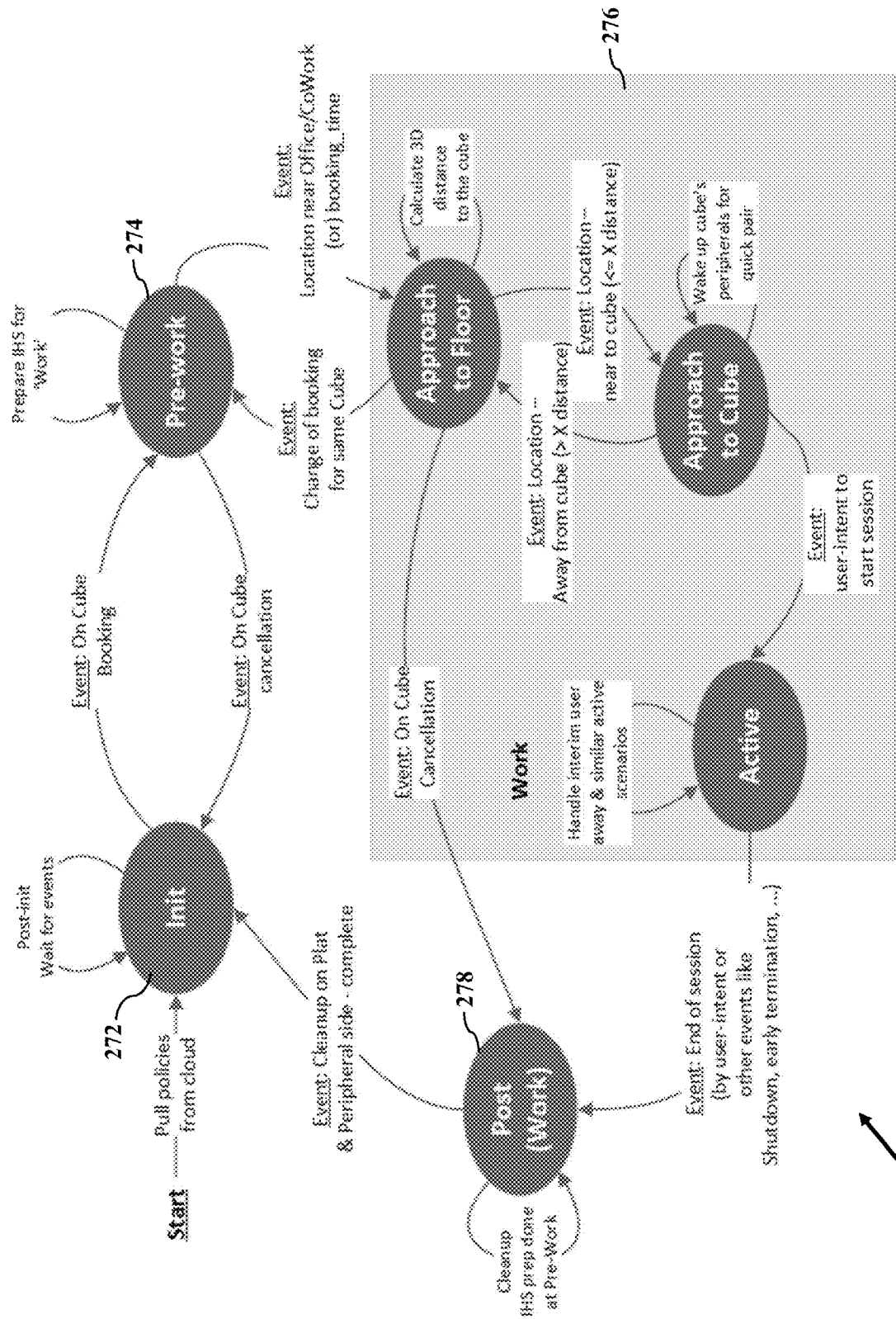
FIGS. 6-8 illustrate a hybrid work state machine and its algorithmic flowgraphs, according to exemplary embodiments.
Figure 7:
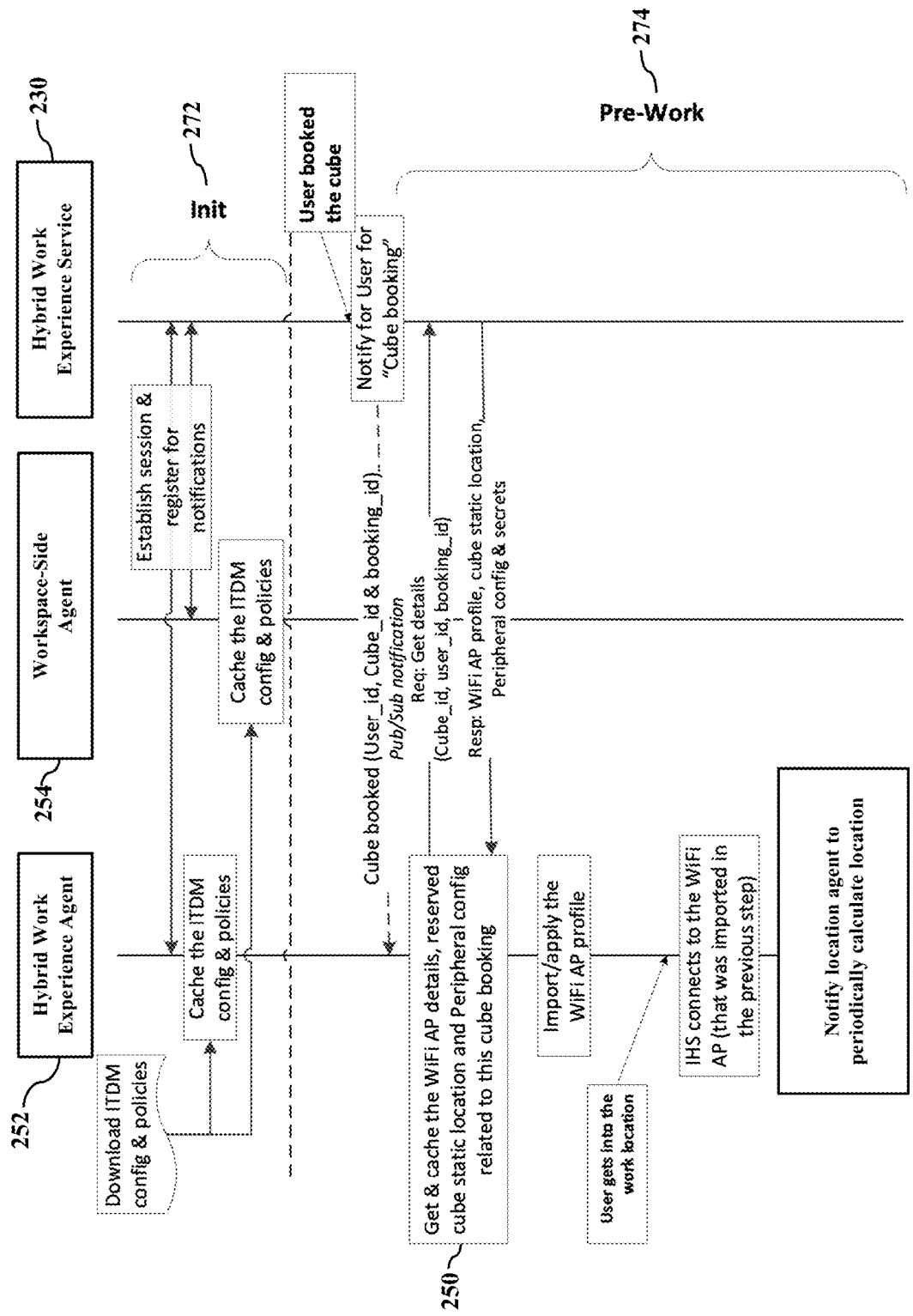
Figure 8:
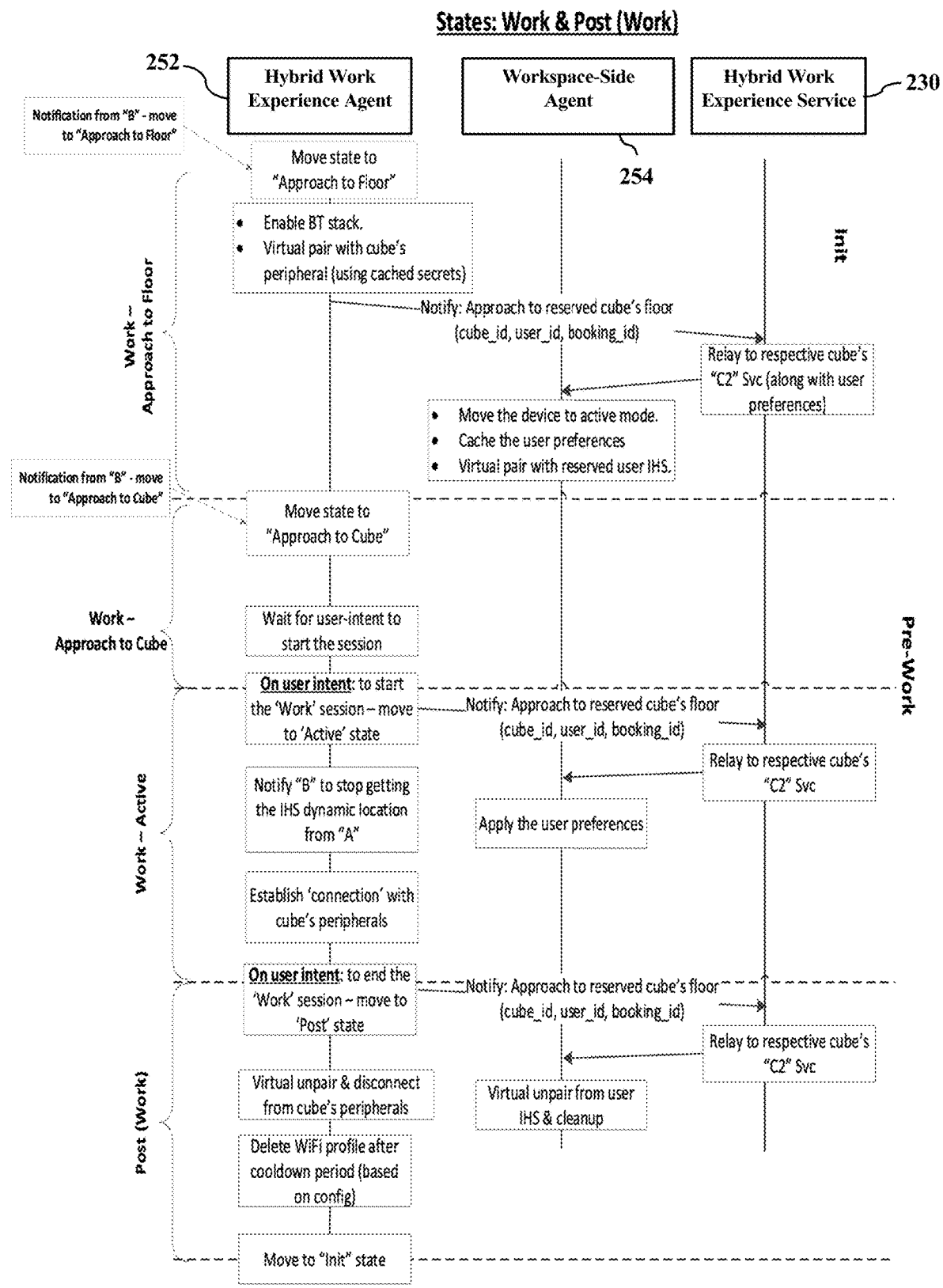

FIGS. 6-8 illustrate the hybrid work state machine 270 and its algorithmic flowgraphs, according to exemplary embodiments. The hybrid work experience agent 252 maintains and manages the hybrid work state machine 270. The hybrid work experience agent 252 is downloaded to the user's personal device 212 (such as the smartphone 214 and/or the laptop computer 224 illustrated in FIG. 3). As FIGS. 6-7 illustrate, exemplary embodiments may have an initialization state 272. When the hybrid work experience agent 252 executes, the hybrid work experience agent 252 pulls the policies 248 from any network resource. While the policies 248 may have any logical structure or statement, at least some of the policies 248 may be location-based (for example, "distance to the cube for starting work=X feet," "timeout for reservation=Y mins," and "WiFi AP scanning frequency=Z secs"). After the policies 248 are retrieved, the hybrid work experience agent 252 may then wait for the next event (such as the reservation 238 describing a cube booking, illustrated in FIG. 3).

The hybrid work experience state machine 270 may have a pre-work state 274. Once the workspace 200 is booked (such as the reservation 238), the hybrid work experience agent 252 establishes communication with the hybrid work experience system/service 230 and imports the networking configurations 250 (for example, WI-FI®, BLUETOOTH®, and other networking profiles associated with wireless access points serving, or in proximity to, the workspace 200 and/or the workspace equipment 220). The location agent 244 registers with the operating system for the wireless access point connect notification (using known registration methods, such as the MICROSOFT® WlanRegisterNotification).

FIGS. 6 and 8 illustrate different, interim work states 276. Once the user's personal device 212 arrives at a predetermined point (that is, the location 210 satisfies a location-based policy 248), the user's personal device 212 (such as the smartphone 214 and/or the laptop computer 224) will be connected automatically to the predefined access point (based on the imported networking configurations 250). Once the user's personal device 212 is connected, the operating system (OS) will notify the location agent 244 saying the user's personal device 212 is connected to the imported WiFi AP. The location agent 244 scans for a nearby WiFi AP and periodically sends the details (BSSID & RSSI) to the location system 242. The location system 242 will return the current location 210 (such as via an IndoorAtlas API and response in GeoJSON format). The current location 210 is then again compared to the policies 248 to determine a next event.

One of the work states 276, for example, is approach to cube's floor. If the location 210 becomes <=1 floor, exemplary embodiments may move or transition to the state "approach to cube's floor," where the location agent 244 enables the BLUETOOTH® stack and uses the interfaces/APIs provided by hybrid work experience agent 252 to do the virtual-pairing with the cube's peripherals 220. The location agent 244 notifies the hybrid work experience system/service 230 that the personal device 212 is in cube's floor. The hybrid work experience system/service 230 relays this event to hybrid work experience agent 252 to wake up, perform the virtual-pairing, and prepare the 'to be connected' peripheral devices 220 with the user preferred configuration. For example, the approaching occupant may have preferred and predefined in-cube camera capture settings with user's preferred color temperature, brightness, overall video settings. Similarly, the docking station 222 will be commanded to wake up its connected peripherals 220.

Another work state 276, for example, is "approach to cube." If the location 210 is <=X feet from the cubicle 202, the location agent 244 moves to the next state "approach to cube." The docking station 222 will be commanded to wake up its connected peripherals 220.

Another work state 276 is "active work." On the user intent to start the session 233, the location agent 244 will move to the next "active work" state. On entering this state, the hybrid work experience agent 252 will notify location agent 244 to stop scanning and getting the current 3D location 210. The hybrid work experience agent 252 establishes the connection with the cube's wireless peripherals 220. The peripherals 220 are thus paired and ready for productive use.

On user intent to end the session 233, the hybrid work experience agent 252 moves to a "post (Work)" state 278. The user's intent to end the session 233 may be inferred from a disconnection of the laptop 224 from the docking station 222. The user's intent to end the session 233 may also be inferred from the location 210 straying too far from the static location of the workspace 200, perhaps for a predetermined max/min time (say 10 mins). On entering this state, the hybrid work experience agent 252 notifies the hybrid work experience system/service 230 that the user's personal device 212 (such as the smartphone 214 and/or the laptop computer 224) has left the cubicle 202 and, thus, intent to end the session 233. The hybrid work experience system/service 230 then checks for a next, upcoming/successive reservation 238 for the workspace 200 by different user.

If so, the hybrid work experience system/service 230 sends that user's virtual pairing information (such as the networking configurations 250) to the hybrid work experience agent 252 installed and executed by the next user's personal device 212. The hybrid work experience system/service 230 also notifies the workspace-side agent(s) (installed and executed by the peripheral equipment 220) to perform virtual unpairing and cleanup with the current user's personal device 212. The hybrid work experience agent 252 virtually pairs the next reserved user's personal device 212 and executes virtual un-pairings of the BLUETOOTH® peripherals 200. The hybrid work experience agent 252 also executes a cleanup deletion of any BLUETOOTH®, WI-FI®, and other network pairing configurations stored at the user's personal device 212, the peripheral equipment 220, and the hybrid work experience system/service 230. Because the work session may be freshly/newly created on any memory 120 (such as a dedicated portion, partition, folder, or other diskspace), exemplary embodiments may store or write the session data, including the networking configurations 250, to the single, dedicated disk location.

When the session 233 ends, all session-related data, including the networking configurations 250, may thus be deleted from the single, dedicated disk location. So, even if the occupant has previously reserved the same workspace 200, and thus previously seen/registered the user's personal device(s) 212, those historical networking configurations 250 are deleted and not retained. With each new reservation, then, the user's personal device(s) 212 are wirelessly unknown and no historical or legacy networking configurations 250 exist. Exemplary embodiments, instead, repeatedly process the user's personal device(s) 212 as newly seen and never before paired/registered. The hybrid work experience agent 252 thus removes the WiFi AP profile after a time-delay (based on the policy 248). The hybrid work experience agent 252 may, optionally, based on the policy 248, put the user's personal device 212 to the low power state. The hybrid work experience agent 252 may then move to the initialization state 272 for fresh pairings as an unknown device.

Overall, the hybrid work experience state machine 270 provides a seamless, zero-touch proximity-based hybrid work solution. Exemplary embodiments receive user/occupant intentions (such as start and stop session) and take actions. Exemplary embodiments seamlessly, with zero manual inputs, tie the booking events, the post booking events at the office floor and cube and the network pairing actions (paring, connection, disconnection, unpairing and cleanup). Exemplary embodiments are easily scaled for multiple hybrid workspaces 200.

Exemplary embodiments may be easily adapted to home environments. The architecture, software agents, and states illustrated in FIGS. 2-8 may be utilized for shared home spaces with shared peripheral devices. Policies may be defined for the locations of home-based desks, tables, and rooms, their corresponding consumer equipment, and hot-swapping residents.

Exemplary embodiments may connect to other personal devices 212. Many user/occupants, for example, may prefer to connect their personal speaker, mouse, headset, and other peripherals. The user may simply prefer the feel, sound, performance, and other features of her personal devices 212. The hybrid work experience agent 252 may thus store, access, and connect to any of the user's personal devices 212 using cached preferences. For example, at cubicle #1, the user may authorize connecting the cubicle's BLUETOOTH® speaker, keyboard, and mouse. At cubicle #2, however, the user may authorize only the cubicle's BLUETOOTH® keyboard and mouse and, instead, prefer to connect her personal BLUETOOTH® headset.

Exemplary embodiments may also be adapted for multi-user sharing of the workspace 200. Multiple occupants, in other words, may reserve the workspace 200 for collaboration. In such a collaborative reservation 238, the workspace-side agent 254 (installed and operating in the IP-based smart docking station 222) works along with the hybrid work experience agent 252 to prepare and connect the right cube's peripherals 220 to the users' laptops 224 and other personal devices 212. The workspace-side agent 254 and the hybrid work experience agent 252 also cooperate to connect the occupants' personal peripherals, perhaps based on the policy 248. For example, occupant/user #1 may authorize connecting the cubicle's display, keyboard, and mouse, but she may prefer her personal BLUETOOTH® pen device. Occupant/User #2, however, may decline all the cubicle's peripheral devices 220 and, instead, prefer to connect and use only her personal devices 212.

Exemplary embodiments may also be adapted for enhanced locational determinations. For example, in addition to retrieving, storing, and using WI-FI® AP details, the user's personal devices 212 (such as the laptop computer 224) may provide WWAN radio details (Unique ID, direction, signal strength) to the location system 242 for identifying the location 210.

Exemplary embodiments thus provide elegant solutions for hoteling users. Exemplary embodiments implement actionable events, based on the dynamic location 210, the static location assigned to the workspace 200, and the occupant's intent (such as start/stop of the session). Exemplary embodiments take actions using the software state machine 270. The workspace 200 is thus pre-prepared or pre-configured for user's preferences, and virtual pairing/unpairing of BLUETOOTH® peripherals 220 provides automatic, seamless connection and cleanup on end-session. The reservation system 238 and/or the location system 242 may be vendor independent and interface with any management, booking, and location solutions.

Figure 9:
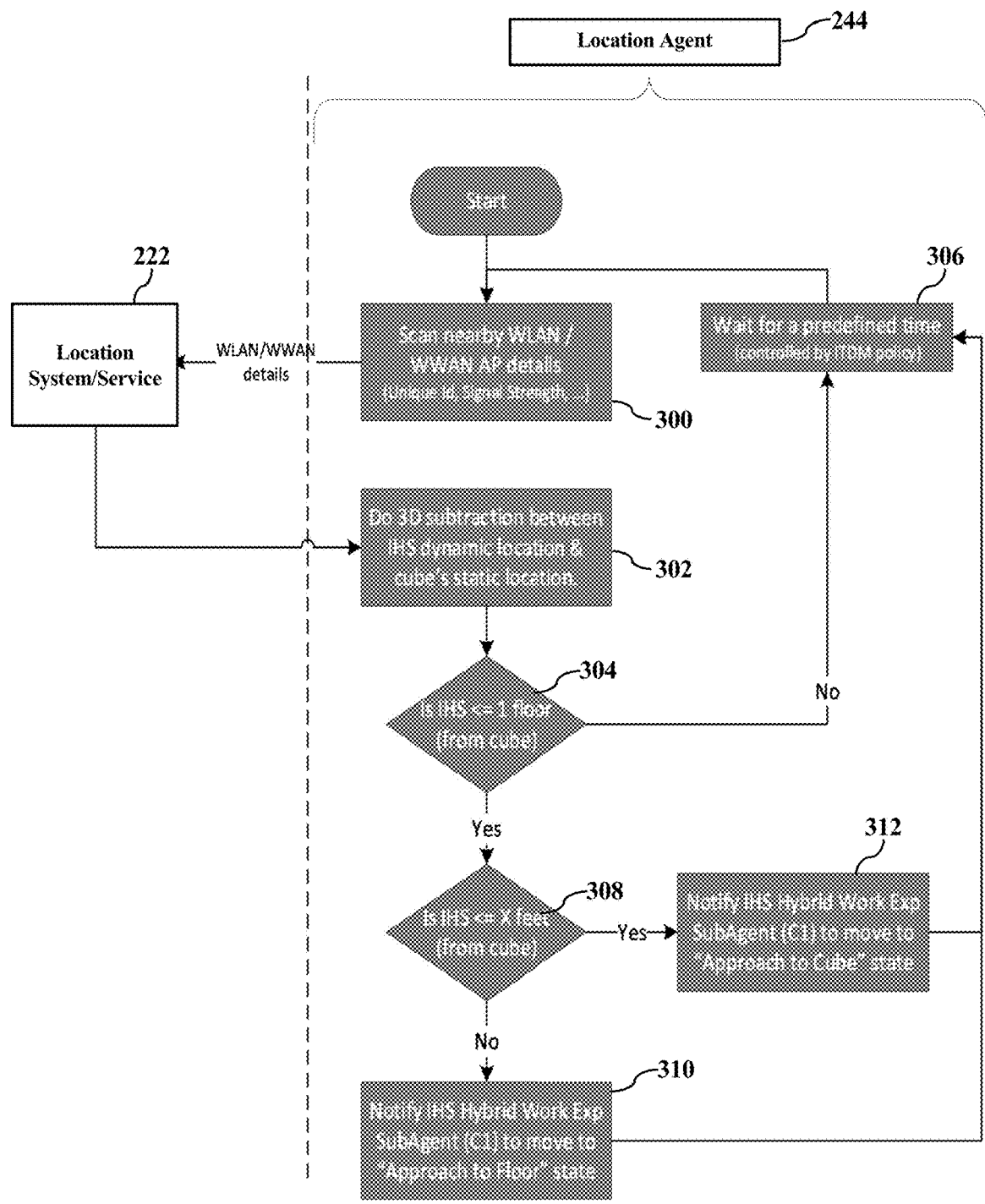
FIG. 9 is a flowchart or algorithm illustrating a method or process for software-based locational network pairing, according to exemplary embodiments.

FIG. 9 is a shows a method or process for software-based locational network pairing, according to exemplary embodiments. The location agent 244 instructs or causes the occupant's personal device 212 to scan, receive, or identify electromagnetic signals (Block 300). The signals, for example, may be radio signals emitted by wireless network access points. The signals may also exhibit frequencies associated with the ISM band in the electromagnetic spectrum (such as those transmitted by BLUETOOTH® devices/networks). Any details associated with the electromagnetic signals are conveyed to the location system/service 222. The location system/service 222 return sends the current location 210 (perhaps expressed as a 3D-distance from the occupant's personal device 212 to the workspace 200 (Block 302). The location 210 is compared to an initial one or more gatekeeper policies 248 (Block 304) (such as whether the occupant's personal device 212 is a floor away from the workspace 200).

If the policy 248 is not satisfied (such as the location 210 being greater than a floor), the location agent 244 waits a predetermined time (Block 306) and rescans for the electromagnetic signals (Block 300). If, however, the location 210 satisfies the initial policies 248 (Block 304), then the location 210 may be compared to subsequent or nested policies 248 (Block 308). If the subsequent or nested policies 248 are not satisfied, then the location agent 244 notifies the hybrid work experience agent 252 to move to the approach to floor state (Block 310, as illustrated by FIGS. 6 and 8), and the location agent 244 waits a predetermined time (Block 306) and rescans for the electromagnetic signals (Block 300). Should, however, the location 210 satisfy the subsequent or nested policies 248 (Block 308), the location agent 244 notifies the hybrid work experience agent 252 to move to the approach to cube state (Block 312, as also illustrated by FIGS. 6 and 8), and the location agent 244 waits a predetermined time (Block 306) and rescans for the electromagnetic signals (Block 300).

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method that automatically network pairs an information handling system to a wireless network broadcast by a wireless access point, the method comprising:
   receiving a hybrid work experience reservation identifying a hybrid workspace reserved for a hybrid work session;
   successively receiving networking information reported by the wireless access point;
   sending, by the information handling system, the networking information reported by the wireless access point to a location service;
   receiving, by the information handling system, indoor locations generated by the location service based on the networking information reported by the wireless access point, each indoor location of the indoor locations representing a corresponding distance to the hybrid workspace reserved for a communications session;
   comparing the indoor locations to location-based policies defined for the hybrid workspace;
   in response to an indoor location satisfying a policy of the location-based policies, instructing a docking station to electrically power peripheral equipment associated with the hybrid workspace;
   in response to another indoor location of the indoor locations satisfying another policy of the location-based policies, identifying a wireless networking information associated with the wireless access point serving the hybrid workspace by querying a hybrid work experience service for a wireless networking information associated with a hybrid work experience reservation; and
   automatically network pairing, by the information handling system, to the wireless network broadcast by the wireless access point serving the hybrid workspace using the wireless networking information associated with the hybrid work experience reservation.

2. The method of claim 1, further comprising selecting a hybrid work experience state associated with the location-based policies.

3. The method of claim 1, further comprising selecting a hybrid work experience state based on the indoor locations.

4. The method of claim 1, wherein in response to an end of the hybrid work experience reservation, further comprising deleting the wireless networking information from the information handling system.

5. The method of claim 1, further comprising receiving a locational update to the indoor locations generated by the location service.

6. The method of claim 1, further comprising establishing a communications session associated with the hybrid work experience reservation.

7. A system that automatically pairs to a wireless network broadcast by a wireless access point, the system comprising:
   a hardware processor; and
   a memory device storing instructions that when executed by the hardware processor perform operations, the operations including:
   receiving a hybrid work experience reservation identifying a hybrid workspace reserved for a hybrid work session;
   successively receiving networking information reported by wireless access points;
   sending the networking information reported by the wireless access points to a location service;
   receiving indoor locations generated by the location service, each of the indoor locations representing a corresponding distance to the hybrid workspace reserved for a communications session;
   comparing the indoor locations to location-based policies defined for the hybrid workspace;
   in response to an indoor location of the indoor locations satisfying a policy of the location-based policies, instructing a docking station to electrically power peripheral equipment associated with the hybrid workspace;
   in response to another indoor location of the indoor locations satisfying another policy of the location-based policies, identifying a wireless networking information associated with the wireless access point serving the hybrid workspace by querying a hybrid work experience service; and
   automatically network pairing to the wireless network broadcast by the wireless access point serving the hybrid workspace using the wireless networking information.

8. The system of claim 7, wherein the operations further include selecting hybrid work experience states based on the location-based policies.

9. The system of claim 7, wherein the operations further include selecting hybrid work experience states based on the indoor locations.

10. The system of claim 7, wherein in response to an end of the hybrid work experience reservation, the operations further include deleting the wireless networking information.

11. The system of claim 7, wherein the operations further include establishing a communications session associated with the hybrid work experience reservation.

12. The system of claim 7, wherein the operations further include automatically pairing to the peripheral equipment associated with the hybrid workspace.

13. The system of claim 7, wherein the operations further include establishing a communications session with the docking station associated with the hybrid workspace.

14. The system of claim 13, wherein the operations further include ending the communications session with the docking station associated with the hybrid workspace.

15. A memory device storing instructions that when executed perform operations that automatically pairs to a wireless network broadcast by a wireless access point, the operations including:
   receiving a hybrid work experience reservation identifying a hybrid workspace reserved for a hybrid work session;
   successively receiving networking information reported by wireless access points;
   sending the networking information reported by the wireless access points to a location service;
   receiving indoor locations generated by the location service, each indoor location of the indoor locations representing a corresponding distance to the hybrid workspace reserved for communications session;
   comparing the indoor locations to location-based policies defined for the hybrid workspace;

in response to an indoor location of the indoor locations satisfying a policy of the location-based policies, instructing a docking station to electrically power peripheral equipment associated with the hybrid workspace;

in response to another indoor location of the indoor locations satisfying another policy of the location-based policies, identifying a wireless networking information associated with the wireless access point serving the hybrid workspace by querying a hybrid work experience service; and automatically network pairing to the wireless network broadcast by the wireless access point serving the hybrid workspace using the wireless networking information.

16. The memory device of claim 15, wherein the operations further include selecting hybrid work experience states based on the location-based policies.

17. The memory device of claim 15, wherein the operations further include selecting hybrid work experience states based on the indoor locations.

18. The memory device of claim 15, wherein the operations further include establishing a communications session with the docking station associated with the hybrid workspace.

19. The memory device of claim 18, wherein the operations further include ending the communications session with the docking station associated with the hybrid workspace.

20. The memory device of claim 15, wherein after a predetermined time expires, the operations further include deleting the wireless networking information.

\* \* \* \* \*